(12) United States Patent  
Hayford et al.

(10) Patent No.: US 8,393,225 B2
(45) Date of Patent: Mar. 12, 2013

(54) BI-AXIAL ELECTROMAGNETIC ACTUATOR

(75) Inventors: Paul Hayford, Holmer Green (GB); Graham Mead, Bucks (GB); Benjamin Jeppesen, Bucks (GB); Thomas Bachmann, Freudenberg (DE); Christoph Scherer, Grobostheim (DE); Thomas Maier, Aschaffenburg (DE)

(73) Assignee: ITW Limited, Berkshire (GB)

( * ) Notice: Subject to any disclaimer, the term of this patent is extended or adjusted under 35 U.S.C. 154(b) by 170 days.

(21) Appl. No.: 12/920,003

(22) PCT Filed: Mar. 5, 2009

(86) PCT No.: PCT/IB2009/050911
§ 371 (c)(1),
(2), (4) Date: Aug. 27, 2010

(87) PCT Pub. No.: WO2009/109935
PCT Pub. Date: Sep. 11, 2009

(65) Prior Publication Data
US 2011/0005328 A1 Jan. 13, 2011

(30) Foreign Application Priority Data
Mar. 6, 2008 (GB) .................................. 0804220.2

(51) Int. Cl.
*G01N 3/00* (2006.01)
(52) U.S. Cl. ........................................ 73/788
(58) Field of Classification Search .............. 73/788
See application file for complete search history.

(56) References Cited

U.S. PATENT DOCUMENTS

| 5,051,635 | A | 9/1991 | Kasahara |
| 6,362,547 | B1* | 3/2002 | Peterson et al. ............... 310/80 |
| 6,371,221 | B1* | 4/2002 | Harrigan et al. ............... 175/26 |
| 6,389,876 | B1* | 5/2002 | Tanimura et al. ............ 73/12.01 |
| 6,433,447 | B1* | 8/2002 | Kitazawa et al. ........... 310/12.14 |

FOREIGN PATENT DOCUMENTS

| DE | 2906404 A1 | 8/1980 |
| DE | 202006019032 U1 | 3/2007 |
| EP | 1607205 A1 | 12/2005 |
| GB | 2097197 A | 10/1982 |
| GB | 2218268 A | 11/1989 |
| JP | 2002071809 A | 3/2002 |
| WO | 2004058448 A2 | 7/2004 |

OTHER PUBLICATIONS

ISR for PCT/IB2009/050911 mailed Dec. 17, 2009.
British Search Report for GB0804220.2 dated Jul. 8, 2008.

* cited by examiner

*Primary Examiner* — Harshad R Patel
*Assistant Examiner* — Jamel Williams
(74) *Attorney, Agent, or Firm* — Lowe Hauptman Ham & Berner, LLP

(57) ABSTRACT

A biaxial electromagnetic actuator for a materials testing apparatus comprises a first electromagnetic actuator for imparting a linear force to an output shaft and a second, direct drive electromagnetic actuator for imparting a rotational force to the shaft. The shaft is mounted in two combination bearings which permit the shaft to move axially and rotationally. One of the bearings is located within a hollow cylindrical member which constitutes the armature of the direct drive actuator in order to provide a compact and symmetrical arrangement.

21 Claims, 2 Drawing Sheets

BI-AXIAL ELECTROMAGNETIC ACTUATOR

RELATED APPLICATIONS

The present application is based on International Application Number PCT/IB2009/050911 filed Mar. 5, 2009, and claims priority from, British Application Number 0804220.2 filed Mar. 6, 2008.

The present invention relates to actuators and particularly to a construction of an electromagnetic actuator for use in testing equipment which requires application of force to a test sample with respect to two different axes.

Electromagnetic actuators such as linear motors have many uses but current attention is being focused on using linear motors as piston and cylinder type devices to replace hydraulic rams. One such use is in the area of testing equipment where it is proposed to mount a linear motor in the form of an electromagnetic ram in an orientation such that the armature of the motor applies force to a test specimen. Normally the orientation of the ram is vertical.

The present invention has as an object, the provision of a construction of electromagnetic actuator which will enable forces to be applied to a test specimen with respect to two different axis in a convenient and cost effective manner. The axes are a linear axis and a rotational axis which are preferably coincident.

Accordingly, the present invention provides an electrically driven biaxial actuator for providing a high axial force, comprising first and second electric motors each having a separate armature, the first motor being a linear electric motor arranged to provide axial movement of an output shaft and the second motor arranged to provide rotary motion of the output shaft.

The preferred use of the actuator is in materials testing equipment where the actuator will be mounted in a vertical orientation i.e. with the axis of the common shaft vertical. The biaxial actuator avoids two separate motors having to be provided at different ends of a specimen under test, and the drawbacks associated therewith and results in a more simple construction. One particular advantage is that thrust bearings are not required for use with the actuator.

Figure 1:
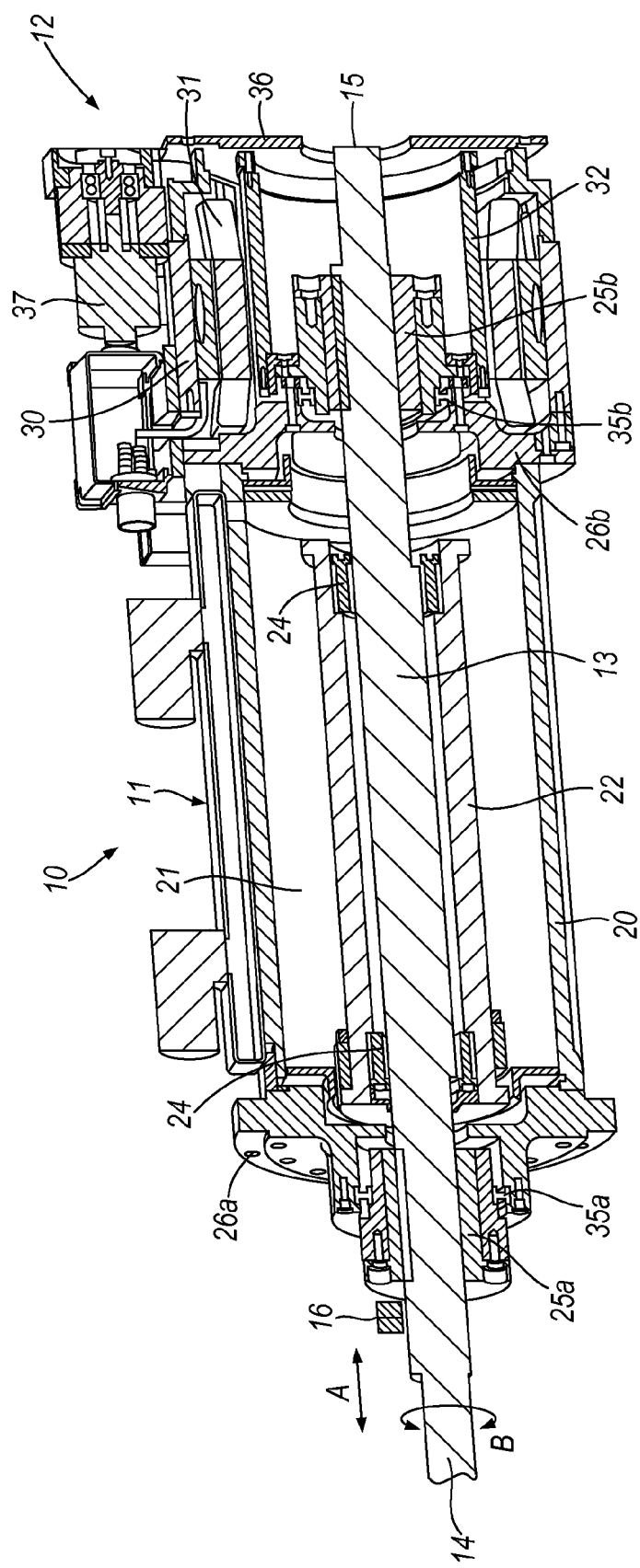
Figure 2:
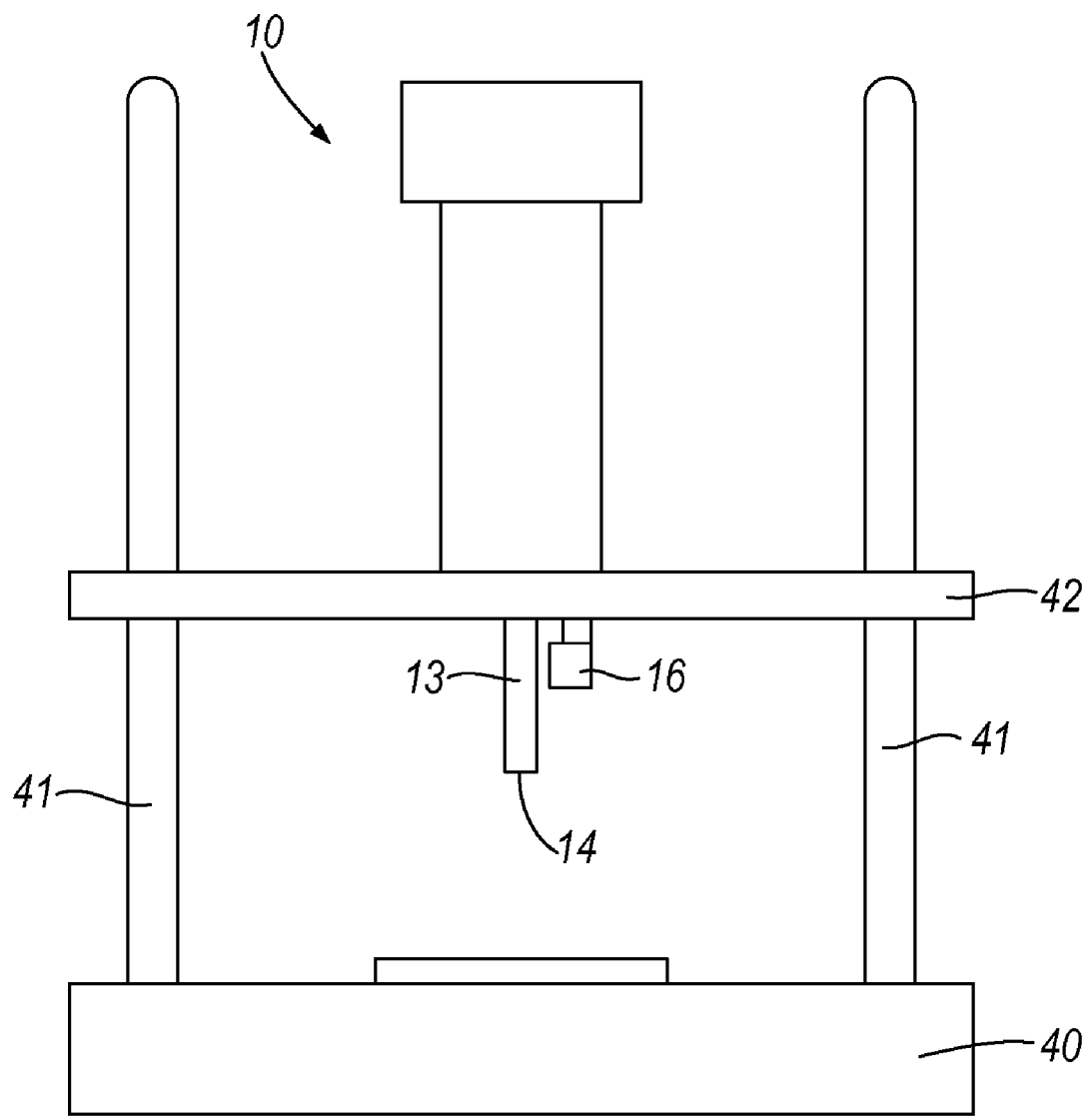

In order that the present invention be more readily understood, an embodiment thereof will now be described by way of example with reference to the accompanying drawing in which FIG. 1 shows a diagrammatic section perspective view of an electromagnetic actuator according to the present invention; and FIG. 2 shows a materials testing apparatus incorporating an actuator as shown in FIG. 1.

It has been possible to utilise electric motors in a materials testing apparatus with one motor applying a linear force to one end of a test specimen while a separate electric motor is used to apply a rotational force to the other end of the test specimen. This, however, is a complicated arrangement which requires the presence of either thrust bearings for the separate electric motor or else a special mounting arrangement for the test specimen.

The preferred embodiment of the present invention is an electromagnetic actuator which is capable of delivering both linear and rotary forces to a shaft. When used in materials testing apparatus, the actuator is normally mounted with the shaft in a vertical orientation and a test specimen is coupled to one end of the shaft. As a result, either linear or rotational forces or a combination of both can be applied to the test specimen. In such testing apparatus, a high axial force is typically required.

Turning now to the drawing, this shows diagrammatically the preferred form of actuator, which is indicated generally by the reference numeral 10 and comprises a linear drive section 11, a rotational drive section 12 and a common shaft 13 extending through both the linear and rotary drive sections and having an output end 14. The other end 15 of the shaft 13 also projects beyond the actuator and may be provided with a brake if desired. The brake is preferably in the form described in our co-pending application no. GB 0618209.1. It will be noted that the rotary drive section 12 is mounted on one end of the linear drive section 11 such that it is remote from the output end 14 of the shaft.

The construction of the linear drive section will now be described in more detail. The section comprises a linear electric motor formed of a cylindrical housing 20 surrounding a plurality of stator coils indicated generally by the reference numeral 21. The stator coils act on an armature 22 which in this embodiment is in the form of a hollow cylindrical member made of a magnetic material and which is arranged to move linearly within the drive section 11 in accordance with conventional linear motor principals. The armature 22 is fastened to the shaft 13 in any convenient fashion such as indicated by the reference numerals 24. Positioning of the shaft within the linear drive section 11 is achieved by means of linear bearings 25a and 25b provided on end flanges 26a and 26b. Preferably, the bearings are ballspline bearings. The linear direct drive section is advantageous over alternative systems where rotary motors are combined, relying on a lead screw and thrust bearing (or another thrust bearing arrangement) to enable axial movement. The preferred embodiment described herein is capable of providing a direct drive mechanism.

The linear electric motor in the linear drive section is a direct drive device which is defined as a brushless electric motor where electric current is used to generate magnetic forces that directly apply a load without a geared arrangement. A rotary de-coupled linear encoder 16 is attached to flange 26a and provides position measurement of the shaft independent of thermal expansion of the motor body or shaft 13. The output from the linear encoder 16 can be used in control equipment for controlling the supply of current to the stator coils thereby controlling movement of the shaft 13.

The rotary drive section 12 will now be described in more detail. This consists of a direct drive electric motor having a cylindrical housing 30 containing stator coils 31 that form the armature of the rotary drive section and also containing a rotor 32 in the form of a hollow cylindrical member. The section 12 is attached to the flange 26b such that the shaft 13 extends along the rotational axis of the drive section 12. The shaft 13 in the vicinity of the drive section 12 is splined and connected to the linear bearing 25b, preferably in the form of a ballspline bearing, which is attached to the rotor 32. The ballspline bearing cooperates with the shaft 13 so as to allow rotation of the shaft 13 when the rotor 32 is rotated but to also allow independent axial movement of the shaft 13 within the bearing without movement of the bearing 25b and thus the rotor 32. Additionally, the linear bearing 25b is also mounted on the end of the flange 26b by means of a rotary bearing 35b. With this form of construction, a single bearing arrangement can be used for the shaft in the region of the rotary drive section 12 and provides the main bearing for the rotor 32. If desired, an additional bearing may be incorporated and attached to an end plate 36. In the arrangement shown in FIG. 1, there is a gap between the end plate 36 and rotor 32. The rotary motor formed in the rotary drive section is attached to back end of the linear electric motor when used in materials testing apparatus, such that the linear motor is closer than the rotary motor to the test specimen. The thrust passes through the linear motor's support and no thrust bearing is required. A high linear force can be applied directly from the linear motor shaft 13 whilst also enabling rotation through the bearing arrangement in the rotary drive section 12.

The rotor 32 is coupled to the bearing 25b and causes a rotational force to be applied to the shaft 13 via the splines on the shaft. Thus, the shaft 13 is subjected to both linear and rotational forces, acting along the axis of the shaft. The separate armatures of each drive section can be controlled independently through control circuitry, and each of the armatures act upon the common shaft. There is thus formed a compact and symmetrical arrangement for driving the shaft.

If desired, and if a ballspline bearing is used as the linear bearing 25a, the linear bearing 25a will be mounted on the flange 26a using a rotary bearing 35a.

The rotary drive section 12 is provided with a rotary encoder 37, preferably belt driven, to enable rotation of the rotor 32 to be detected. The output from the rotary encoder 37 is used in a control unit (not shown) which is used to drive the rotary drive section 12.

If desired, a co-axial linear variable displacement transducer may be coupled to the end 15 of the shaft 13 through a hollow shaft.

The above-described construction has the advantage that the actuator is compact and the shaft coupled to a test sample can be accurately controlled.

Turning now to FIG. 2, this shows a materials testing apparatus comprising a table 40 on which a sample to be tested is fixed. The term "sample" is intended to cover a material, structure, or component on which testing is to be carried out. A frame in the form of uprights 41 and cross-head 42 supports an electromagnetic actuator 10 as described above. The cross-head 42 is provided with an aperture through which the shaft 13 depends. The output end 14 of the shaft is provided with a gripper which is fixed to the sample to be tested. It is preferred that the sensor 16 is located on the shaft 13 on the same side of the cross-head 42 as the sample to be tested as this provides more accurate results. With the above construction, a sample may be subject to both linear and rotational forces without there being any need to provide linear thrust bearings. In particular, such an arrangement is suited to a materials testing apparatus where large forces need to be provided. The electromagnetic actuator 10 which has a linear actuator can be controlled to provide instantaneous force application and removal which is useful in a materials testing apparatus. Furthermore, the use of the electromagnetic actuator 10 with direct drive motors allows many thousands of axial fatigue tests to be carried out with minimum wear on parts providing axial forces but at the same time being able to provide rotary force.

The invention claimed is:

1. An electrically driven biaxial actuator, comprising:
   an output shaft;
   first and second electric motors each having a separate armature, the first motor being a linear electric motor arranged to provide axial movement of the output shaft, and the second motor arranged to provide rotary motion of the output shaft, and
   a mechanical brake for arresting movement of the output shaft in the absence of electrical power.

2. An actuator according to claim 1, wherein the first motor is a direct drive motor.

3. An actuator according to claim 1, wherein the second motor is a direct drive motor.

4. An actuator according to claim 1, wherein the second motor is arranged at an end of the first motor remote from an output end of the output shaft.

5. An actuator according to claim 1, further comprising:
   first and second linear bearings located outside the magnetic field of the first motor.

6. An actuator according to claim 5, wherein one of the linear bearings is positioned in the vicinity of the armature of the second motor.

7. An actuator according to claim 6, wherein the one linear bearing is located between the rotor of the second motor and the output shaft of the actuator.

8. An actuator according to claim 7, wherein the one linear bearing is coupled to the first motor through a rotary bearing.

9. An actuator according to claim 6, wherein the other of the linear bearings is coupled to the first motor by a rotary bearing.

10. An actuator according to claim 5, wherein the one linear bearing is a ballspline bearing.

11. An actuator according to claim 1, wherein the second motor has a rotor in the form of a hollow cylinder.

12. An actuator according to claim 1, wherein the output shaft has splines at least in a region of the second motor and the armature of the second motor is arranged to apply a rotational force to the output shaft via the splines.

13. A materials testing apparatus, comprising an actuator according to claim 1.

14. Apparatus according to claim 13, further comprising:
    a frame including uprights and a cross-head for mounting the actuator in a vertical orientation with the output shaft of the actuator projecting through an aperture in the cross-head, wherein the output shaft has an output end arranged to be coupled to a sample under test.

15. Apparatus according to claim 14, further comprising:
    a rotary de-coupled linear encoder unit coupled to the output shaft in a region between the cross-head and the output end of the output shaft.

16. An electrically driven biaxial actuator, comprising:
    an output shaft;
    first and second electric motors each having a separate armature, the first motor being a linear electric motor arranged to provide axial movement of the output shaft, and the second motor arranged to provide rotary motion of the output shaft; and
    first and second linear bearings located outside the magnetic field of the first motor,
    wherein one of the linear bearings is coupled to the first motor by a rotary bearing.

17. An actuator according to claim 16, wherein the other of the linear bearings is positioned in the vicinity of the armature of the second motor.

18. An actuator according to claim 17, wherein the other of the linear bearings is located between the rotor of the second motor and the output shaft of the actuator.

19. An actuator according to claim 18, wherein the other of the linear bearings is coupled to the first motor through a rotary bearing.

20. An actuator according to claim 17, wherein the other of the linear bearings is a ballspline bearing.

21. A materials testing apparatus, comprising:
    an electrically driven biaxial actuator, comprising:
        an output shaft, and
        first and second electric motors each having a separate armature, the first motor being a linear electric motor arranged to provide axial movement of the output shaft, and the second motor arranged to provide rotary motion of the output shaft;

a frame including uprights and a cross-head for mounting the actuator in a vertical orientation with the output shaft of the actuator projecting through an aperture in the cross-head, wherein the output shaft has an output end arranged to be coupled to a sample under test; and a rotary de-coupled linear encoder unit coupled to the output shaft in a region between the cross-head and the output end of the output shaft.

* * * * *